United States Patent
Roy Chowdhury et al.

(10) Patent No.: US 11,592,566 B2
(45) Date of Patent: Feb. 28, 2023

(54) VEHICLE SYSTEMS AND METHODS UTILIZING LIDAR DATA FOR ROAD CONDITION ESTIMATION

(71) Applicant: Volvo Car Corporation, Gothenburg (SE)

(72) Inventors: Sohini Roy Chowdhury, Santa Clara, CA (US); Minming Zhao, Mountain View, CA (US); Srikar Muppirisetty, Mölndal (SE)

(73) Assignee: Volvo Car Corporation, Gothenburg (SE)

( * ) Notice: Subject to any disclaimer, the term of this patent is extended or adjusted under 35 U.S.C. 154(b) by 255 days.

(21) Appl. No.: 16/541,264

(22) Filed: Aug. 15, 2019

(65) Prior Publication Data

US 2021/0048529 A1   Feb. 18, 2021

(51) Int. Cl.
  *G01S 17/89*  (2020.01)
  *B60W 40/068* (2012.01)
  (Continued)

(52) U.S. Cl.
  CPC .......... *G01S 17/89* (2013.01); *B60W 40/068* (2013.01); *B60W 50/14* (2013.01); *G06V 20/56* (2022.01);
  (Continued)

(58) Field of Classification Search
  CPC ... G01S 17/89; G01S 17/931; G06K 9/00791; B60W 50/14; B60W 40/068
  See application file for complete search history.

(56) References Cited

U.S. PATENT DOCUMENTS 9,139,204 B1   9/2015 Zhao et al.
9,188,981 B2   11/2015 Israelsson
(Continued)

FOREIGN PATENT DOCUMENTS

DE  19932094 A1  1/2001
EP  2698299 A1   2/2014
(Continued)

OTHER PUBLICATIONS

Dec. 14, 2020 European Search Report issued on International Application No. 20189826.
(Continued)

*Primary Examiner* — Christian Chace
*Assistant Examiner* — Shayne M. Gilbertson
(74) *Attorney, Agent, or Firm* — Clements Bernard Walker; Christopher L. Bernard

(57) ABSTRACT

A system and method for estimating road conditions ahead of a vehicle, including: a LIDAR sensor operable for generating a LIDAR point cloud; a processor executing a road condition estimation algorithm stored in a memory, the road condition estimation algorithm performing the steps including: detecting a ground plane or drivable surface in the LIDAR point cloud; superimposing an M×N matrix on at least a portion of the LIDAR point cloud; for each patch of the LIDAR point cloud defined by the M×N matrix, statistically evaluating a relative position, a feature elevation, and a scaled reflectance index; and, from the statistically evaluated relative position, feature elevation, and scaled reflectance index, determining a slipperiness probability for each patch of the LIDAR point cloud; and a vehicle control system operable for, based on the determined slipperiness probability for each patch of the LIDAR point cloud, affecting an operation of the vehicle.

20 Claims, 17 Drawing Sheets

(51) Int. Cl.
*B60W 50/14* (2020.01)
*G06V 20/56* (2022.01)

(52) U.S. Cl.
CPC ... *B60W 2050/146* (2013.01); *B60W 2420/52* (2013.01); *B60W 2552/40* (2020.02)

(56) References Cited

U.S. PATENT DOCUMENTS

| | | | |
|---|---|---|---|
| 9,453,941 | B2 | 9/2016 | Stainvas Olshansky |
| 9,598,087 | B2 | 3/2017 | Zhao et al. |
| 2013/0194565 | A1* | 8/2013 | Sorensen ............... G01N 21/55 356/73 |
| 2014/0307247 | A1* | 10/2014 | Zhu .................... B60W 40/064 342/54 |
| 2015/0178572 | A1 | 6/2015 | Omer |
| 2015/0367855 | A1* | 12/2015 | Parchami ............ G06V 20/588 701/1 |
| 2015/0371095 | A1 | 12/2015 | Hartmann et al. |
| 2018/0203113 | A1* | 7/2018 | Taylor ....................... G06T 7/11 |
| 2019/0077407 | A1 | 3/2019 | Miura et al. |
| 2019/0178989 | A1 | 6/2019 | Tsai et al. |
| 2019/0317218 | A1 | 10/2019 | Cao et al. |
| 2020/0081124 | A1* | 3/2020 | Shi ........................ G01S 17/931 |

FOREIGN PATENT DOCUMENTS

| | | |
|---|---|---|
| EP | 3299993 A1 | 3/2018 |
| JP | 2004280339 A | 10/2004 |
| JP | 3817611 B2 | 9/2006 |
| WO | 2013173911 A1 | 11/2013 |
| WO | 2017068743 A1 | 4/2017 |
| WO | 2018054910 A2 | 3/2018 |
| WO | 2018119902 A1 | 7/2018 |

OTHER PUBLICATIONS

Llata et al., LIDAR Design for Road Condition Measurement ahead of moving vehicle, Member IEEE, Department of Electronics Technology.
Abstract.

* cited by examiner

VEHICLE SYSTEMS AND METHODS UTILIZING LIDAR DATA FOR ROAD CONDITION ESTIMATION

TECHNICAL FIELD

The present disclosure relates generally to the automotive and vehicle safety fields. More particularly, the present disclosure relates to vehicle systems and methods utilizing LIDAR data for road condition estimation.

BACKGROUND

Some modern vehicles report measured road condition to the cloud for subsequent use by other vehicles. The pre-emptive knowledge or estimation of road condition (i.e., slipperiness or friction) can significantly reduce road condition-related accidents. Often such road condition estimation is local and camera based, and may include segmenting a camera image of the drivable surface in front of a vehicle into M×N patches and assessing the textural characteristics of each portion of the patches for road surface slipperiness, road rutting, etc.

The pre-emptive knowledge or estimation of road condition is especially important in autonomous driving (AD) settings, where an AD setting may be turned off to ensure safety conditions specifically if a road surface ahead is predicted to be too slippery or a path with the greatest expected friction may be preferred in such situations, for example. Most camera-based systems can detect and analyze the road surface ahead with high confidence and high reliability up to about 50 m under well-lit conditions, with the road condition within several meters of the wheel tracks being the most important for path planning, for example.

LIDAR sensors are generally capable of detecting the road surface in terms of relative road surface location (x and y coordinates), road surface height (z coordinate), and reflectance (r) reliably up to 70-100 m ahead. Thus, this information can be used to predict the road surface condition within several meters of the wheel tracks, assisting in path planning significantly.

When a vehicle is in AD mode, the early detection of detrimental (i.e., slippery) road conditions in the form of ice patches, slush patches, water patches, etc. is necessary to trigger a stop to AD functionalities and guide a human driver to take over for assured safety conditions. Thus, advance warning of road conditions is imperative. Again, relative slipperiness analysis of the road surface ahead can also lend useful insights for path planning.

Because LIDAR sensors can operate at significant distances ahead of a vehicle as compared to conventional front-facing cameras, the relative position of the road surface, the height of accumulation on the road surface, and the scaled reflectance index of each road surface point can be used with a machine learning (ML) model to predict slippery road surfaces ahead, raise alerts, and selectively disable AD mode.

To date, M×N patches have been superimposed on a front-facing camera image of a road surface to predict a patchiness index of the road surface up to 30-50 m ahead. Here, five lateral patches may be used, for example, including a patch under each vehicle wheel, a center patch between the vehicle wheel patches, and two side patches outside of the vehicle wheel patches. Such a front-facing camera image 10 with the superimposed patches and a bird's eye view (BEV) transformation 12 of the front-facing camera image 10 with the superimposed patches broken into columns and rows are shown in FIG. 1. It is possible to extend this framework to predict road condition farther in front of the vehicle more reliably using x, y, z, and r LIDAR measurements.

To date, LIDAR sensors have been used to detect the depth of water on the road surface ahead of a vehicle, with the LIDAR sensor mounted close to the ground to enhance visibility. However, this setup is not scalable to long-range object or road surface detection. For such applications, a higher LIDAR sensor mounting position on the vehicle is preferred.

Such higher LIDAR sensor mounting positions have been used, however, typically to track reflectance on a road surface along two straight-line paths, supposedly where the wheels will contact the road surface. These one-dimensional (1-D) signals along the wheel paths correspond to the reflectance (r) along the wheel paths and can be used to detect the presence of water or ice along the wheel paths using statistical and/or ML models. However, the 1-D signals are vendor and scenario sensitive and do not provide a view of the entire road condition ahead. Dividing the road surface ahead into patches and using both accumulation height (z) and reflectance (r) parameters would provide a holistic view of road condition and aid motion control and path planning for AD, as well as advanced driver assistance systems (ADAS), modalities.

Finally, existing LIDAR sensor systems have been used generally to detect road unevenness, such as road irregularities and potholes, and maneuver a vehicle away from such road unevenness, without maximizing the inputs from the perception sensor to control switching between AD/ADAS modalities and aid in path planning. This could be done through the superimposition of spatial patches on the road surface to generate pseudo-clusters indicative of the probability of a road condition (slipperiness, ice, snow, slush, and water), p, to provide a holistic view of road condition and aid motion control and path planning for AD, as well as ADAS, modalities.

SUMMARY

Thus, in various exemplary embodiments, the present disclosure provides systems and methods utilizing LIDAR data for road condition estimation that segment the road surface ahead of a vehicle into M×N patches and, optionally, BEV transform this construct. For each segment, x, y, z, and r are then determined—taking full advantage of position, accumulation height, and reflectance information to aid motion control and path planning for AD, as well as ADAS, modalities.

The LIDAR point clouds are utilized with the M×N patches, as opposed to simply clustering the road surface based on absolute r indices, as relative variations in r are observed for the same road surface and the associated deterministic values are not always consistent. Thus, if there is a uniform pitch of black road surface ahead, ideally all points would have the same r index, but this is not the practical case, as the distance from the LIDAR sensor, light scattering, and variations in scanning patterns all have significant impacts. The context of r is learnable, but not always the values, so clustering based on r index is unreliable and non-generalizable. Accordingly, the M×N patches on the road surface are designed to find patterns on the road surface that should have been clustered if r was a reliable and repeatable entity.

In one exemplary embodiment, the present disclosure provides a method for estimating road condition ahead of a vehicle utilizing a LIDAR sensor, the method including: obtaining a LIDAR point cloud from the LIDAR sensor; detecting a ground plane or drivable surface in the LIDAR point cloud; superimposing an M×N matrix on at least a portion of the LIDAR point cloud; for each patch of the LIDAR point cloud defined by the M×N matrix, statistically evaluating a relative position, a feature elevation, and a scaled reflectance index; from the statistically evaluated relative position, feature elevation, and scaled reflectance index, determining a slipperiness probability for each patch of the LIDAR point cloud; and, based on the determined slipperiness probability for each patch of the LIDAR point cloud, one or more of alerting a driver of the vehicle to an upcoming slippery road condition, enabling/disabling one of a driver assist and an autonomous driving functionality, providing a display of an estimated road condition ahead to the driver of the vehicle for one or more of motion and path planning purposes, updating a past determined slipperiness probability for each patch of a past LIDAR point cloud, and reporting the determined slipperiness probability for each patch of the LIDAR point cloud to a cloud server. The LIDAR sensor is coupled to the vehicle above the ground plane or drivable surface. The method further includes transforming the LIDAR point cloud from a three-dimensional LIDAR point cloud to a bird's-eye-view LIDAR point cloud. Detecting the ground plane or drivable surface in the LIDAR point cloud includes detecting the ground plane or drivable surface in the LIDAR point cloud using one of an unsupervised iterative algorithm and a supervised deep learning/machine learning algorithm. The scaled reflectance index is scaled by its relative distance from the LIDAR sensor.

In another exemplary embodiment, the present disclosure provides a non-transitory computer readable medium for estimating road condition ahead of a vehicle stored in a memory and executed by a processor to perform the steps including: obtaining a LIDAR point cloud from a LIDAR sensor; detecting a ground plane or drivable surface in the LIDAR point cloud; superimposing an M×N matrix on at least a portion of the LIDAR point cloud; for each patch of the LIDAR point cloud defined by the M×N matrix, statistically evaluating a relative position, a feature elevation, and a scaled reflectance index; from the statistically evaluated relative position, feature elevation, and scaled reflectance index, determining a slipperiness probability for each patch of the LIDAR point cloud; and, based on the determined slipperiness probability for each patch of the LIDAR point cloud, one or more of alerting a driver of the vehicle to an upcoming slippery road condition, enabling/disabling one of a driver assist and an autonomous driving functionality, providing a display of an estimated road condition ahead to the driver of the vehicle for one or more of motion and path planning purposes, updating a past determined slipperiness probability for each patch of a past LIDAR point cloud, and reporting the determined slipperiness probability for each patch of the LIDAR point cloud to a cloud server. The LIDAR sensor is coupled to the vehicle above the ground plane or drivable surface. The steps further include transforming the LIDAR point cloud from a three-dimensional LIDAR point cloud to a bird's-eye-view LIDAR point cloud. Detecting the ground plane or drivable surface in the LIDAR point cloud includes detecting the ground plane or drivable surface in the LIDAR point cloud using one of an unsupervised iterative algorithm and a supervised deep learning/machine learning algorithm. The scaled reflectance index is scaled by its relative distance from the LIDAR sensor.

In a further exemplary embodiment, the present disclosure provides a system for estimating road condition ahead of a vehicle, the system including: a LIDAR sensor operable for generating a LIDAR point cloud; a processor executing a road condition estimation algorithm stored in a memory, the road condition estimation algorithm performing the steps including: detecting a ground plane or drivable surface in the LIDAR point cloud; superimposing an M×N matrix on at least a portion of the LIDAR point cloud; for each patch of the LIDAR point cloud defined by the M×N matrix, statistically evaluating a relative position, a feature elevation, and a scaled reflectance index; and, from the statistically evaluated relative position, feature elevation, and scaled reflectance index, determining a slipperiness probability for each patch of the LIDAR point cloud; and a vehicle control system operable for, based on the determined slipperiness probability for each patch of the LIDAR point cloud, one or more of alerting a driver of the vehicle to an upcoming slippery road condition, enabling/disabling one of a driver assist and an autonomous driving functionality, providing a display of an estimated road condition ahead to the driver of the vehicle for one or more of motion and path planning purposes, updating a past determined slipperiness probability for each patch of a past LIDAR point cloud, and reporting the determined slipperiness probability for each patch of the LIDAR point cloud to a cloud server. The LIDAR sensor is coupled to the vehicle above the ground plane or drivable surface. The steps performed by the road condition estimation algorithm further include transforming the LIDAR point cloud from a three-dimensional LIDAR point cloud to a bird's-eye-view LIDAR point cloud. Detecting the ground plane or drivable surface in the LIDAR point cloud includes detecting the ground plane or drivable surface in the LIDAR point cloud using one of an unsupervised iterative algorithm and a supervised deep learning/machine learning algorithm. The scaled reflectance index is scaled by its relative distance from the LIDAR sensor.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

The present disclosure provides systems and methods utilizing LIDAR data for road condition estimation that segment the road surface ahead of a vehicle into M×N patches and, optionally, BEV transform this construct. For each segment, x, y, z, and r are then determined—taking full advantage of position, accumulation height, and reflectance information to aid motion control and path planning for AD, as well as ADAS, modalities.

The LIDAR point clouds are utilized with the M×N patches, as opposed to simply clustering the road surface based on absolute r indices, as relative variations in r are observed for the same road surface and the associated deterministic values are not always consistent. Thus, if there is a uniform pitch of black road surface ahead, ideally all points would have the same r index, but this is not the practical case, as the distance from the LIDAR sensor, light scattering, and variations in scanning patterns all have significant impacts. The context of r is learnable, but not always the values, so clustering based on r index is unreliable and non-generalizable. Accordingly, the M×N patches on the road surface are designed to find patterns on the road surface that should have been clustered if r was a reliable and repeatable entity.

Figure 1:
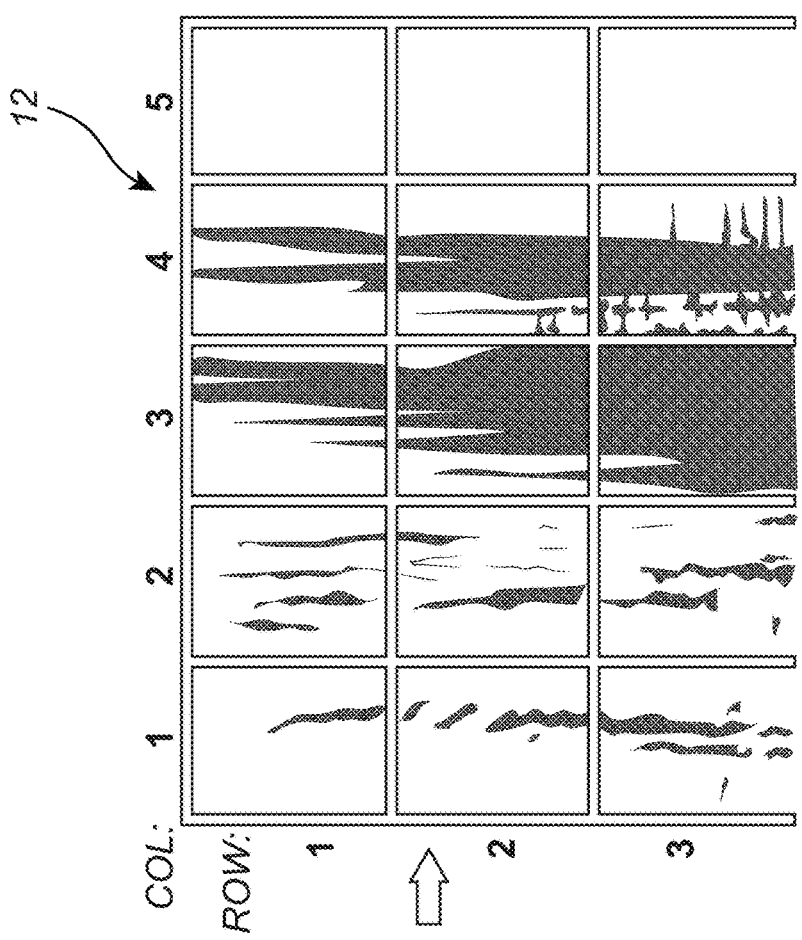
FIG. 1 is a front-facing camera image with superimposed patches and a BEV transformation of the front-facing camera image with the superimposed patches broken into columns and rows, in accordance with one aspect of the present disclosure.
Figure 1:
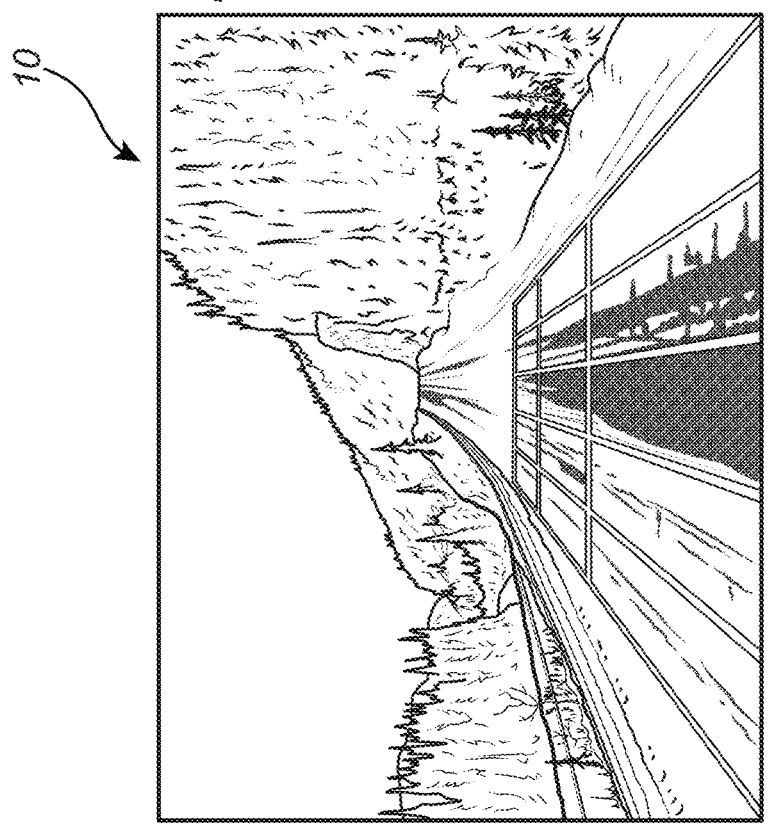
Figure 2:
FIG. 2 is a front-facing camera image and a corresponding LIDAR point cloud, highlighting z and r indices, in accordance with one aspect of the present disclosure.
Figure 2:
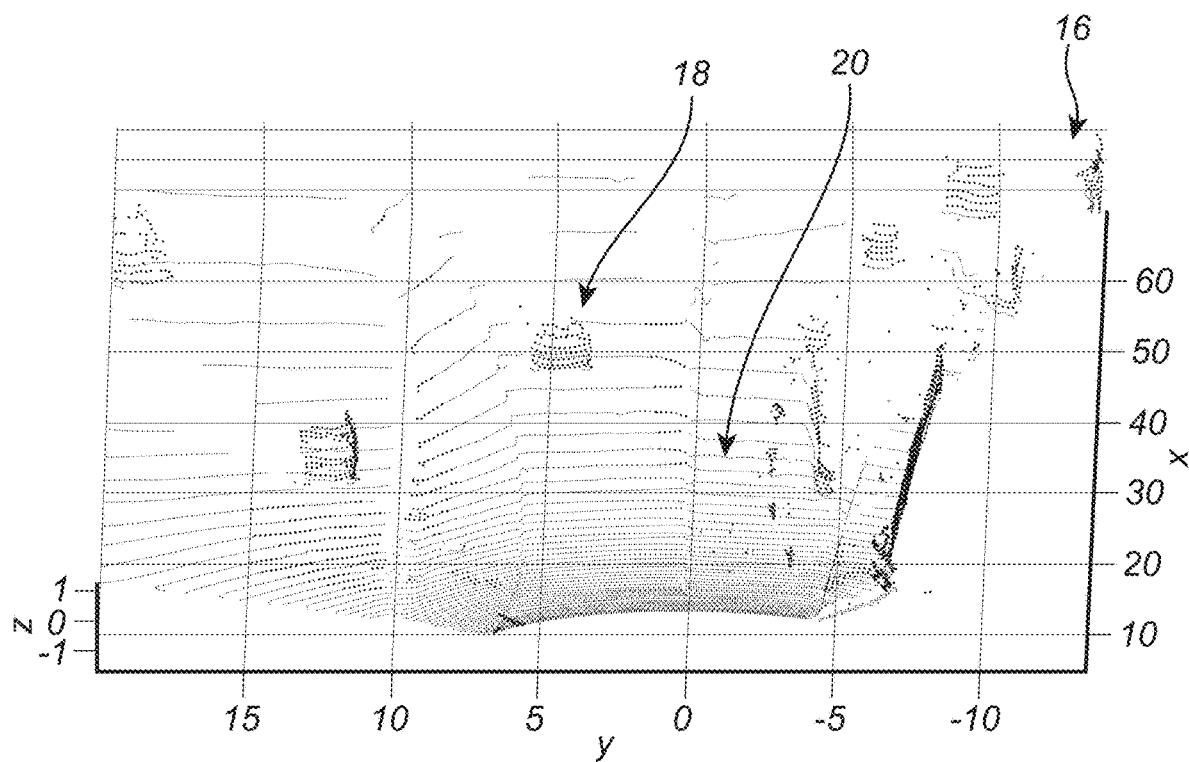

FIG. 2 is a front-facing camera image 14 and a corresponding LIDAR point cloud 16, highlighting z and r indices. The ground plane or drivable surface 18 is shown, as well as objects with larger z values.

Figure 3:
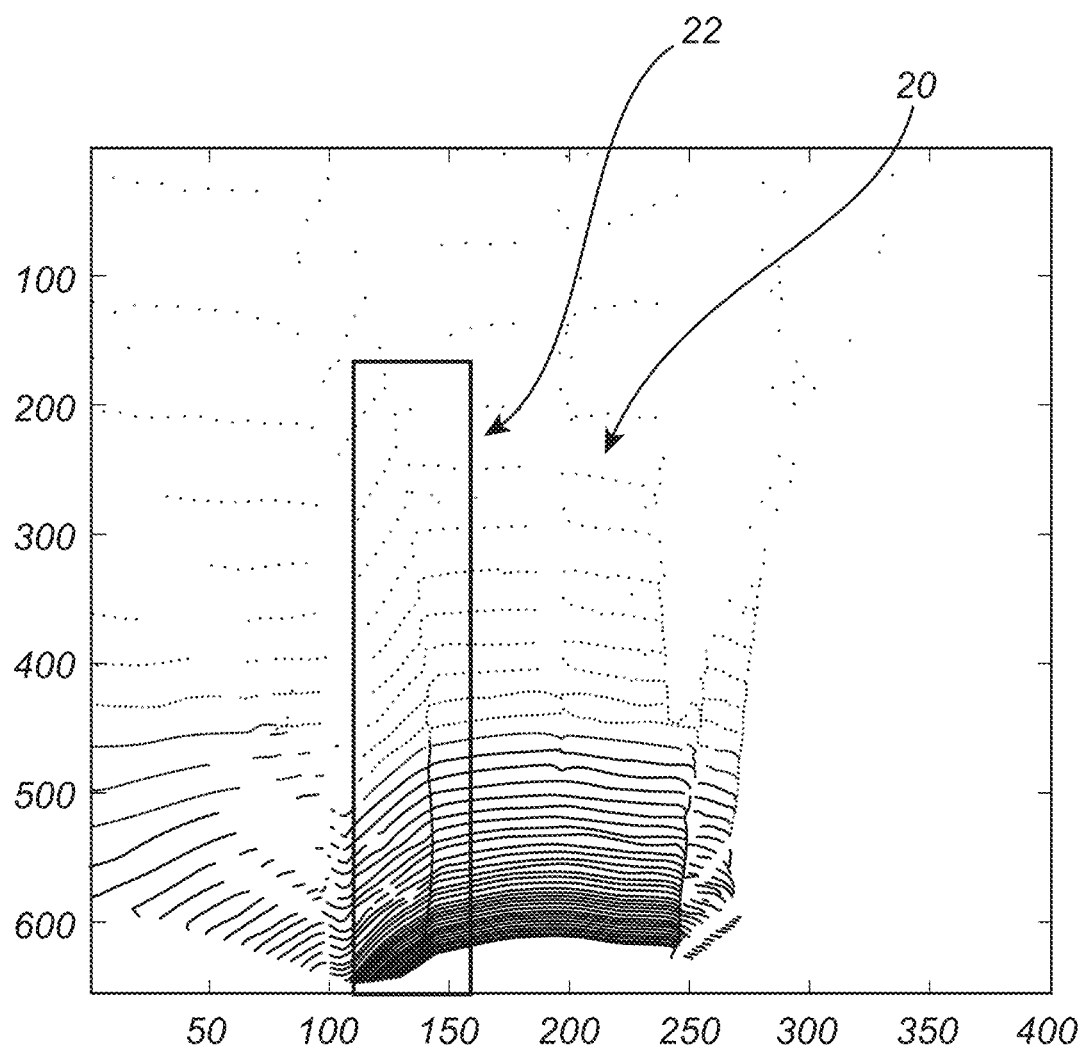
FIG. 3 is a BEV LIDAR point cloud showing a ground plane or drivable surface and z values as intensity, in accordance with one aspect of the present disclosure.
Figure 4:
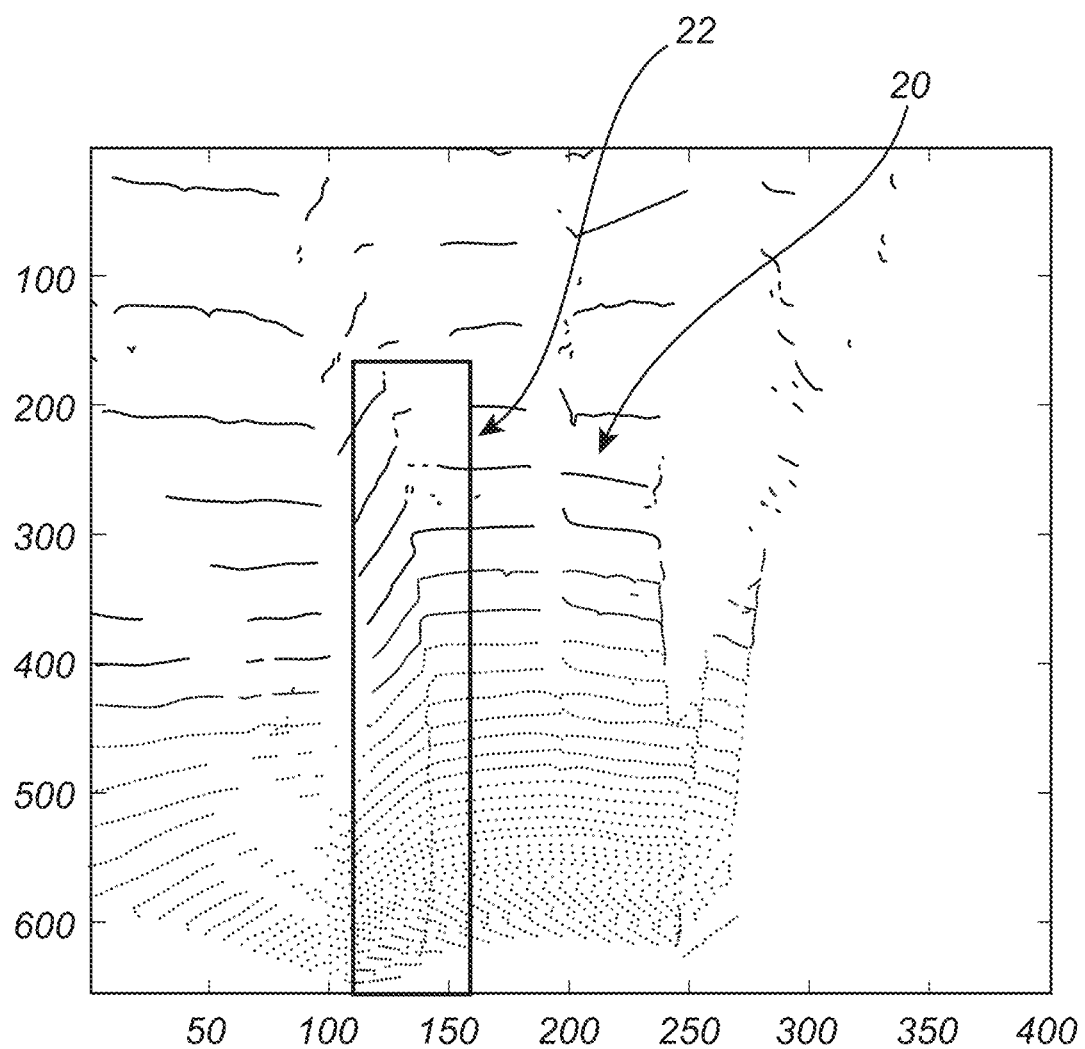
FIG. 4 is a BEV LIDAR point cloud showing a ground plane or drivable surface and r values as intensity, in accordance with one aspect of the present disclosure.

FIG. 3 is a BEV LIDAR point cloud showing a ground plane or drivable surface and z values as intensity, while FIG. 4 is a BEV LIDAR point cloud showing a ground plane or drivable surface and r values as intensity. Here, a divider 22 is highlighted, which has a different z and r than the surrounding road surface 20.

Figure 5:
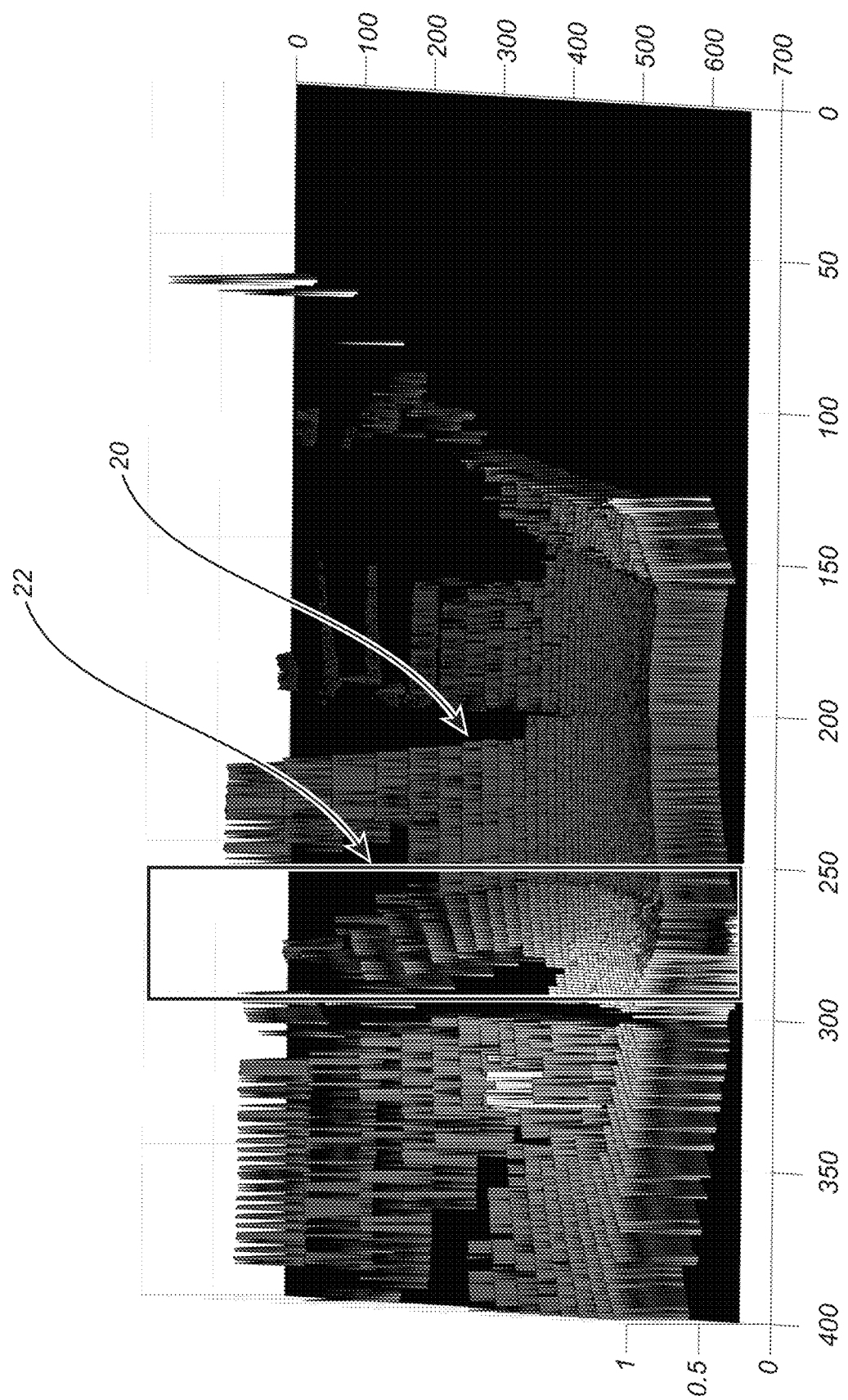
FIG. 5 is a three-dimensional (3-D) surface plot of the BEV LIDAR point cloud of FIG. 3 showing a ground plane or drivable surface and z values as intensity, in accordance with one aspect of the present disclosure.
Figure 6:
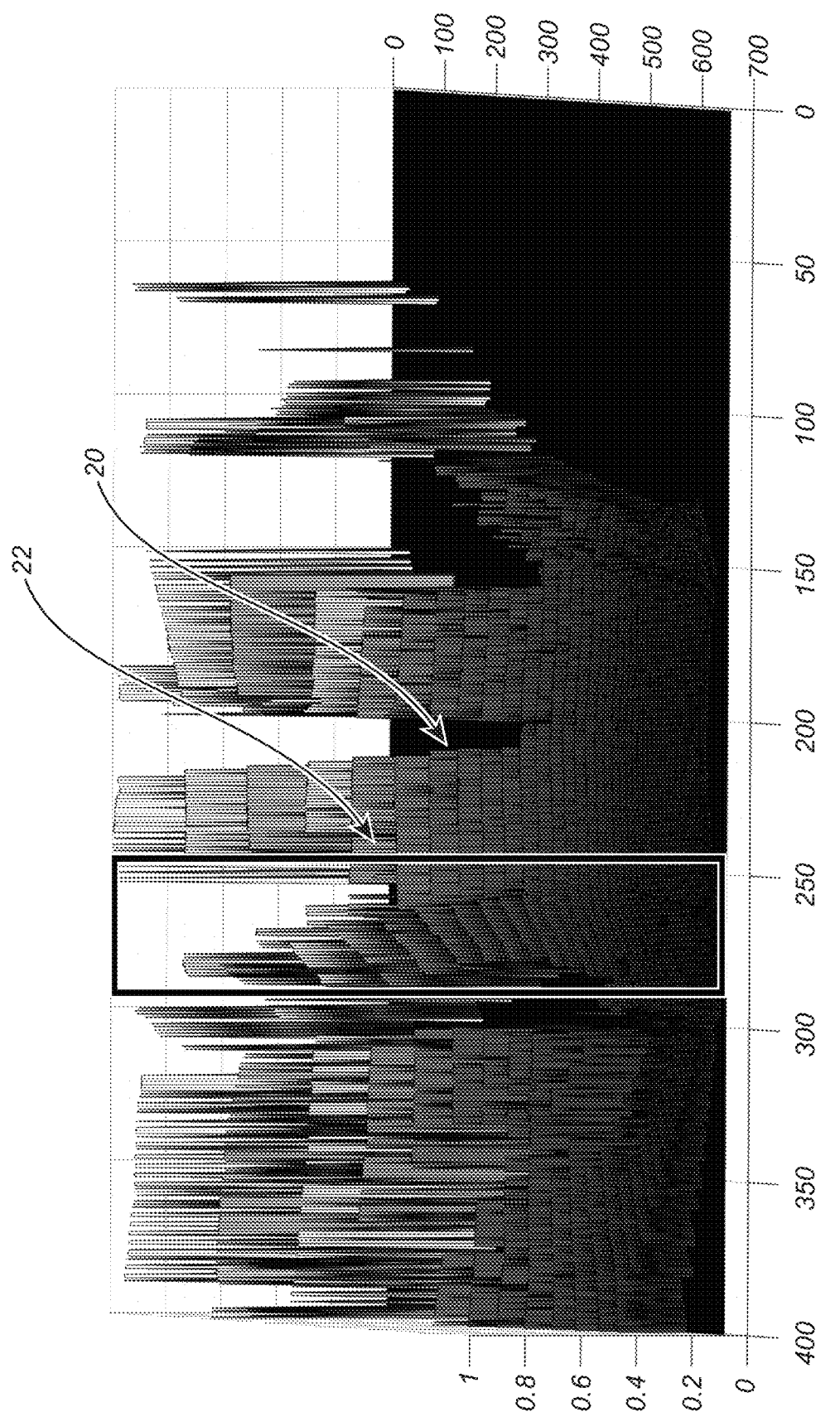
FIG. 6 is a 3-D surface plot of the BEV LIDAR point cloud of FIG. 4 showing a ground plane or drivable surface and r values as intensity, in accordance with one aspect of the present disclosure.

FIG. 5 is a 3-D surface plot of the BEV LIDAR point cloud of FIG. 3 showing the ground plane or drivable surface and z values as intensity, while FIG. 6 is a 3-D surface plot of the BEV LIDAR point cloud of FIG. 4 showing the ground plane or drivable surface and r values as intensity. Again, the divider 22 is highlighted, which has a different z and r values than the surrounding road surface 20. The r metrics vary with respect to distance from the LIDAR sensor. The pattern changes across sharp edges, but the r values are not consistent across the surface. The z values are more consistent across the surface. Thus, surface-level clustering using r may be feasible for short distances but is not scalable/generalizable. Thus, a patch scheme utilizing both z and r is preferable.

Figure 7:
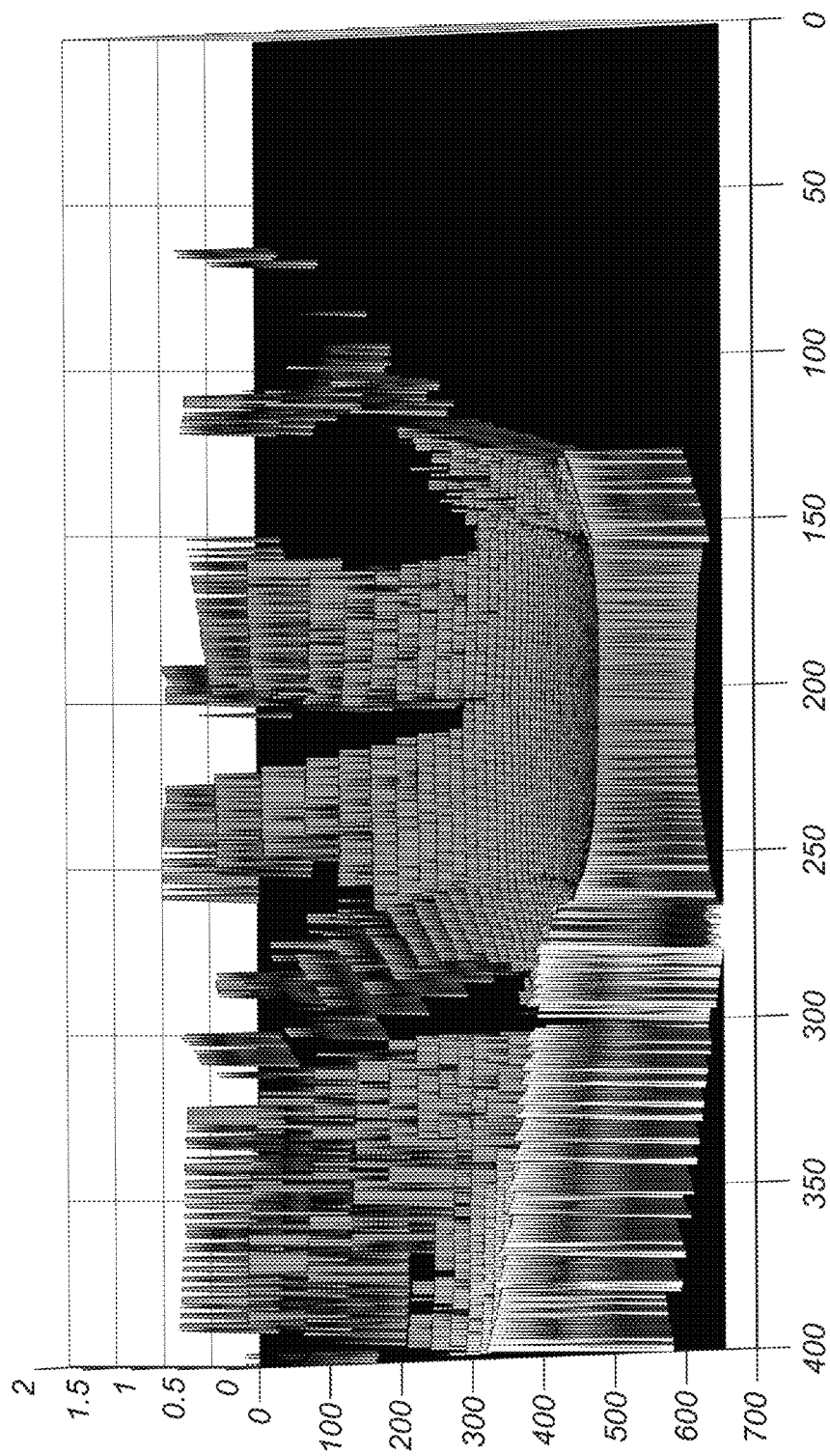
FIG. 7 is another 3-D surface plot of the BEV LIDAR point cloud of FIG. 4 showing a ground plane or drivable surface and r values as intensity, scaled as r/x, in accordance with one aspect of the present disclosure.

FIG. 7 is another 3-D surface plot of the BEV LIDAR point cloud of FIG. 4 showing a ground plane or drivable surface and r values as intensity, scaled as r/x (or r/x$^2$, depending on the LIDAR specifications). The scaling of r by the distance, x, from the LIDAR sensor improves relative surface classification performance.

Figure 8:
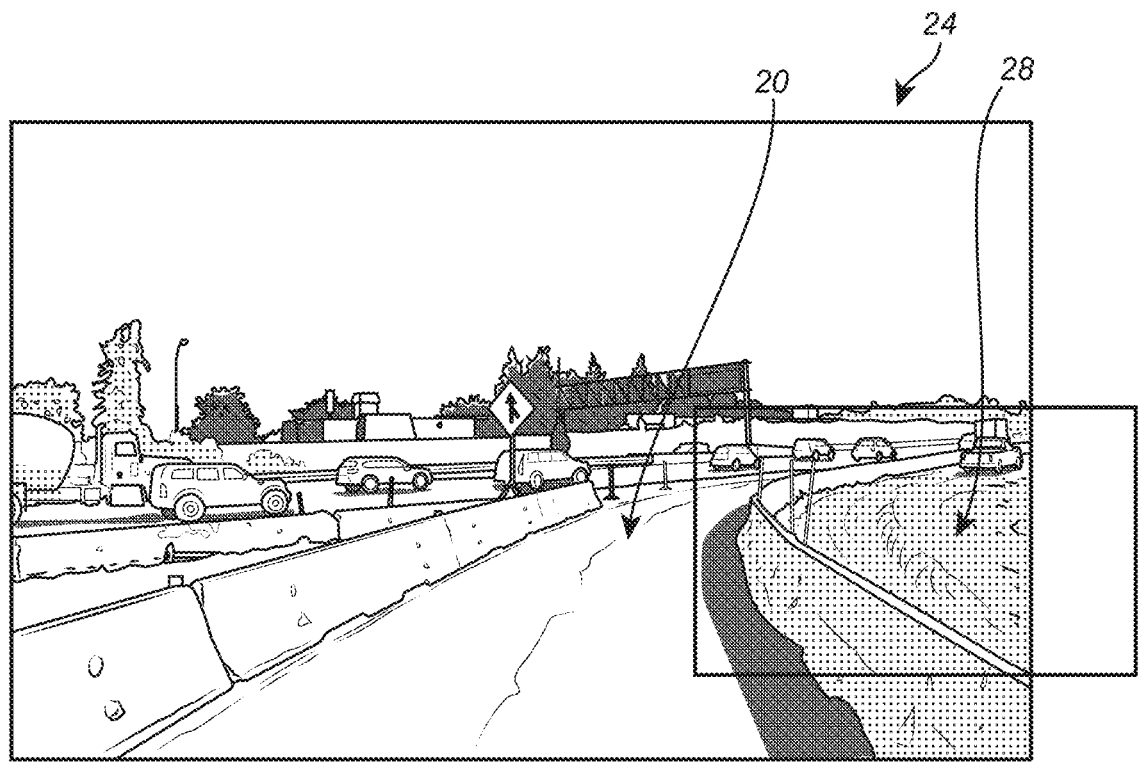
FIG. 8 is a front-facing camera image and a corresponding LIDAR point cloud, highlighting z and r indices, in accordance with another aspect of the present disclosure.
Figure 8:
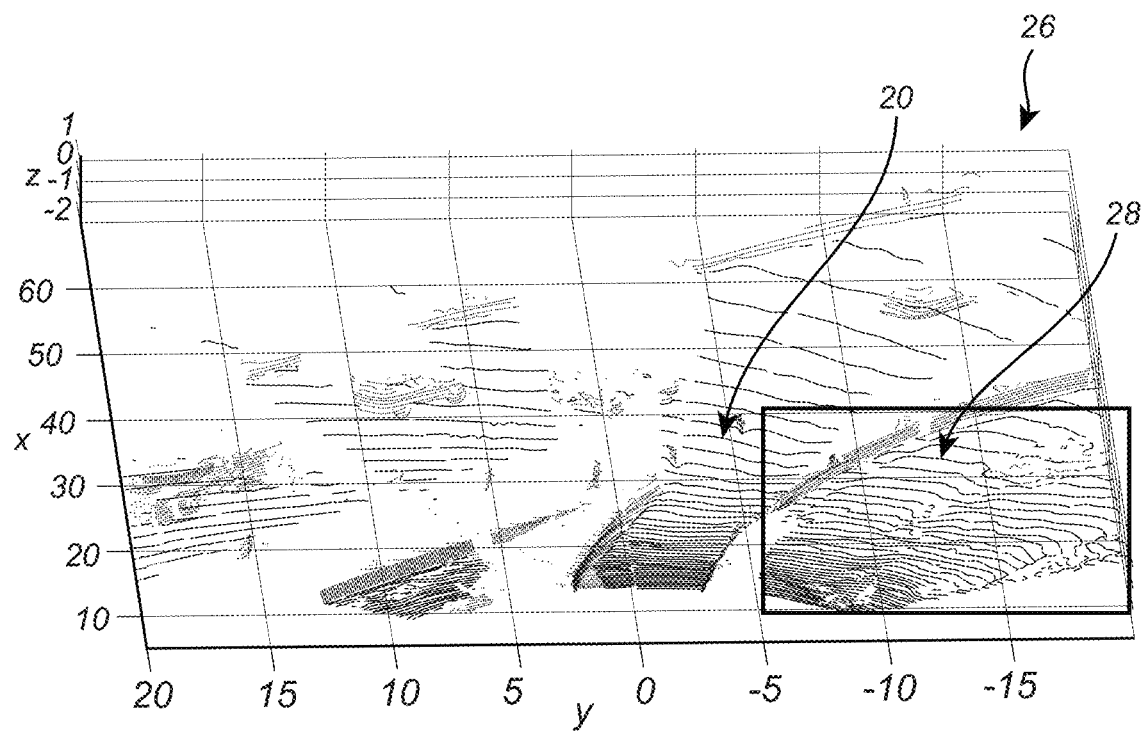

FIG. 8 is another front-facing camera image 24 and a corresponding LIDAR point cloud 26, highlighting z and r indices. The road surface 20 is shown, as well as an area off the road surface 28 that has a different surface texture.

Figure 9:
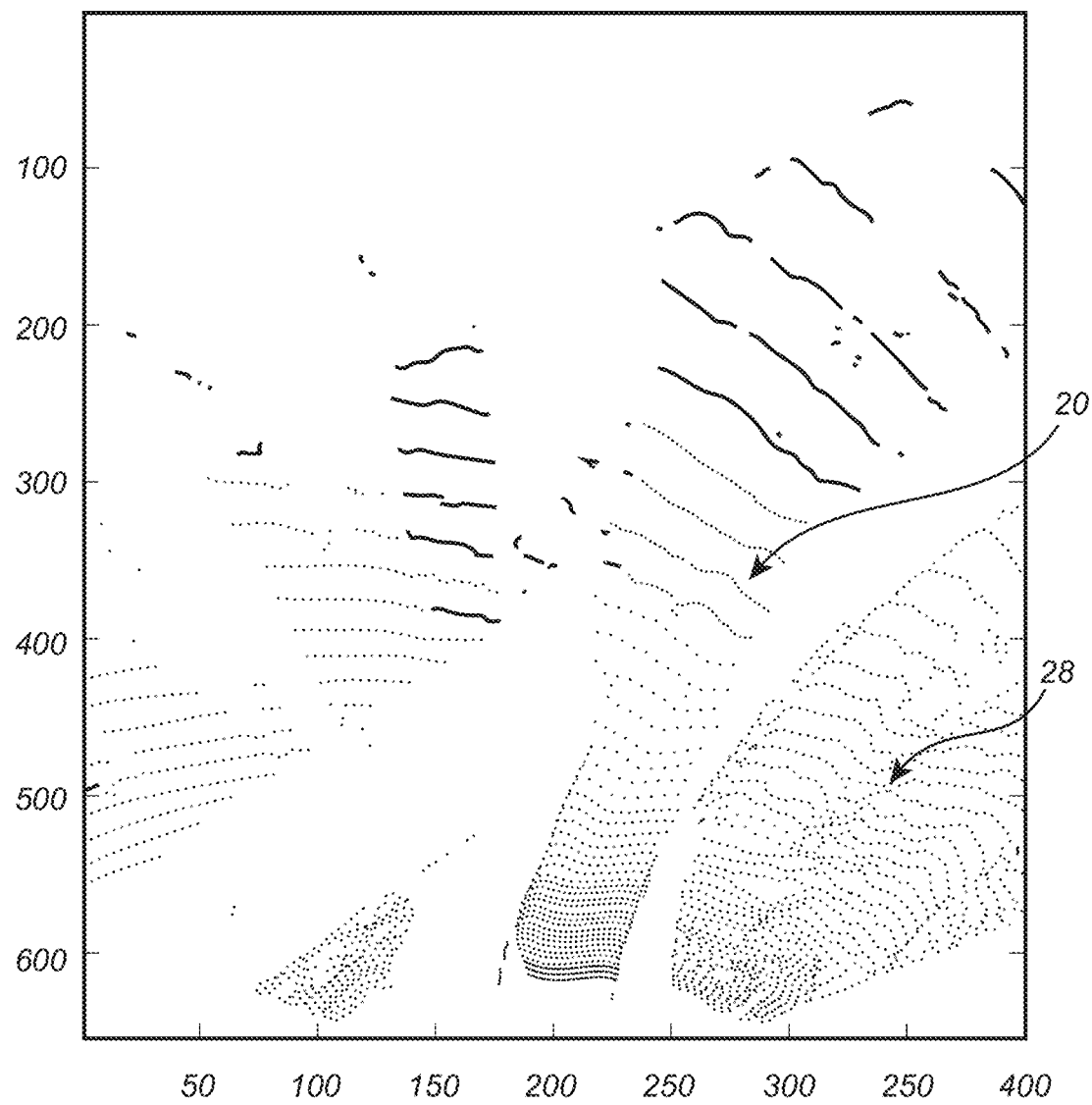
FIG. 9 is a BEV LIDAR point cloud showing a ground plane or drivable surface and z values as intensity, in accordance with another aspect of the present disclosure.
Figure 10:
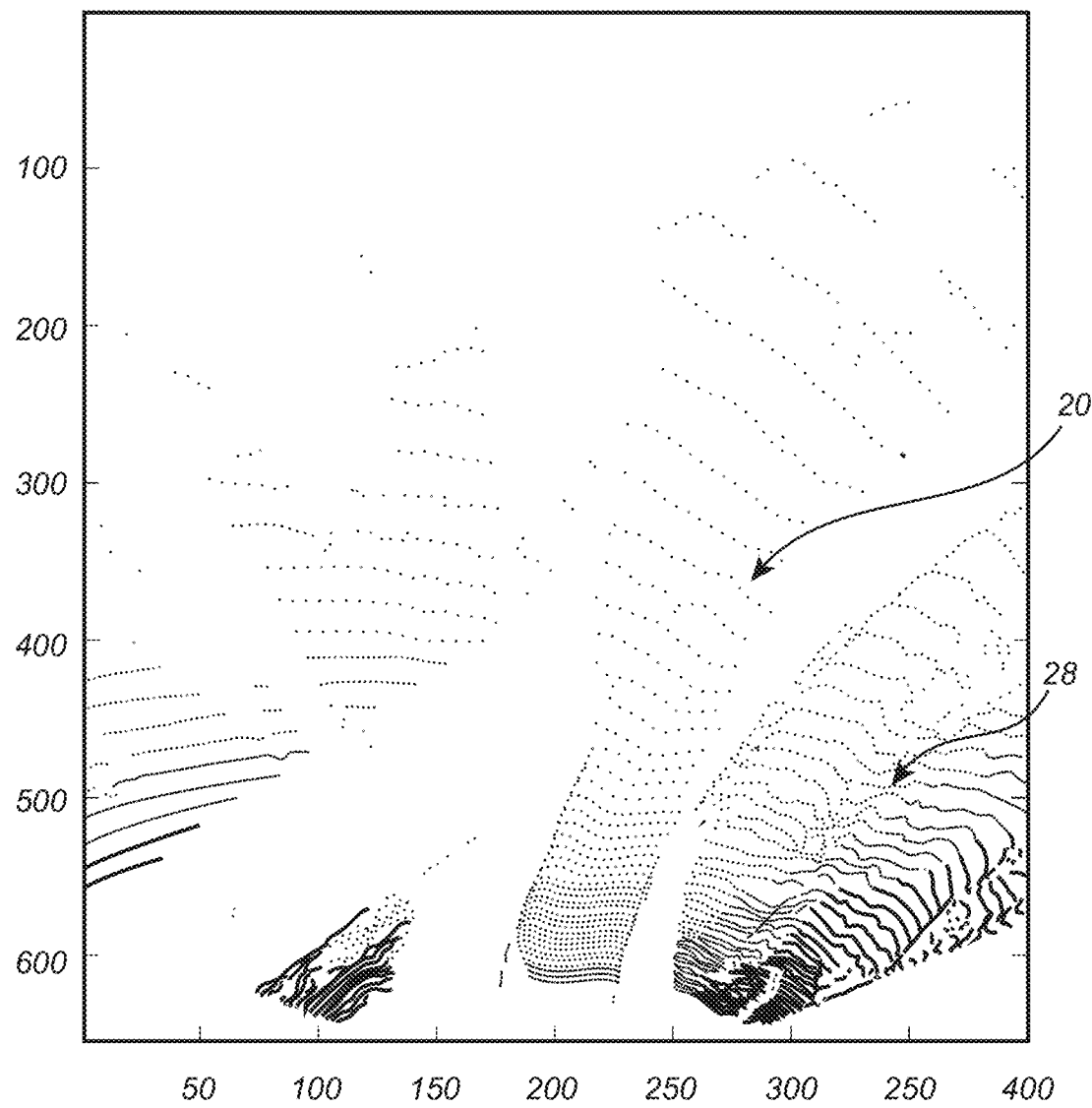
FIG. 10 is a BEV LIDAR point cloud showing a ground plane or drivable surface and scaled r values, r/x, as intensity, in accordance with another aspect of the present disclosure.

FIG. 9 is a BEV LIDAR point cloud showing a ground plane or drivable surface and z values as intensity, while FIG. 10 is a BEV LIDAR point cloud showing a ground plane or drivable surface and scaled r values, r/x, as intensity. Again, the off-road surface 28 is highlighted, which has a different z and r/x values than the surrounding road surface 20.

Figure 11:
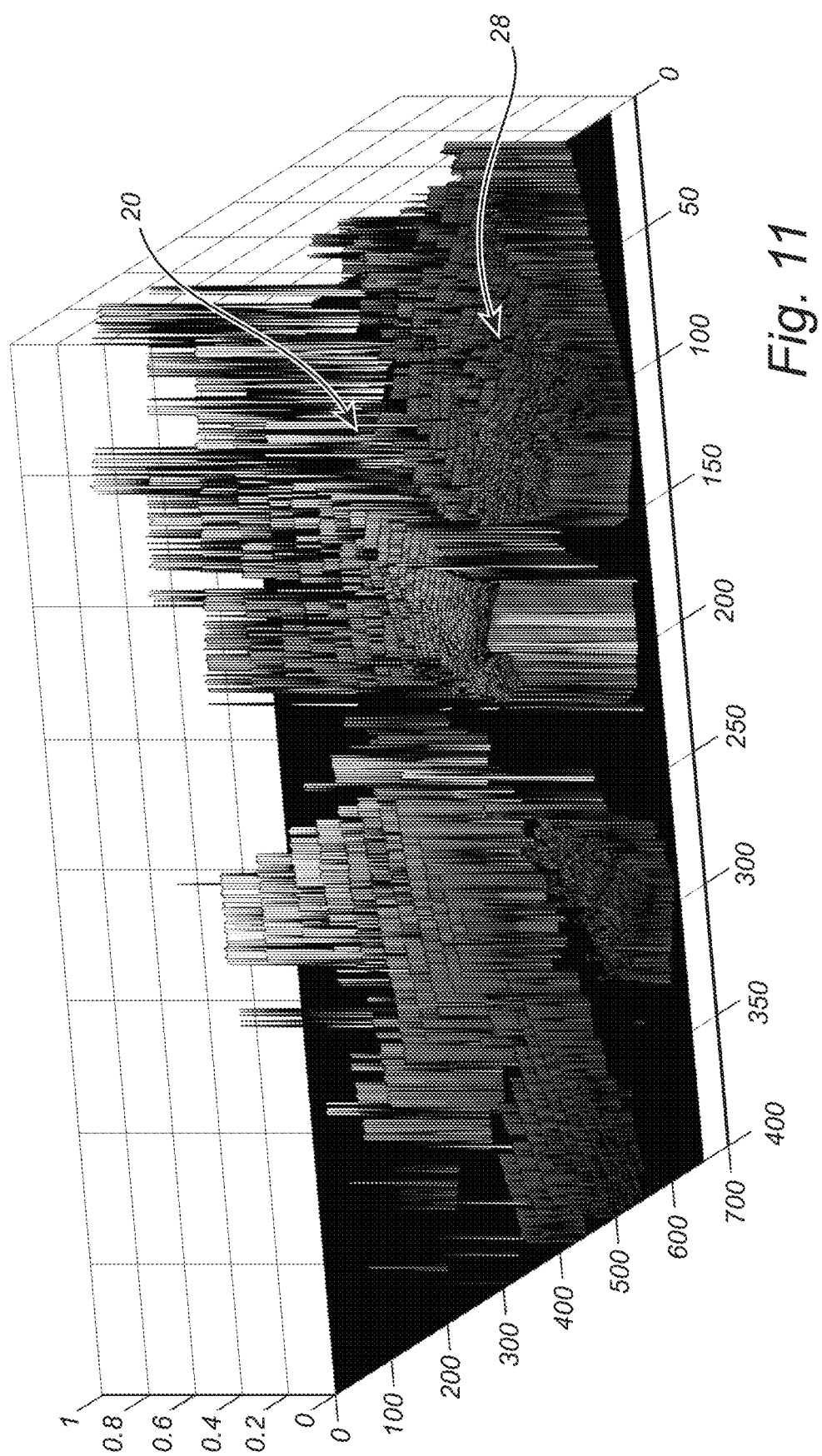
FIG. 11 is a 3-D surface plot of the BEV LIDAR point cloud of FIG. 9 showing a ground plane or drivable surface and z values as intensity, in accordance with another aspect of the present disclosure.
Figure 12:
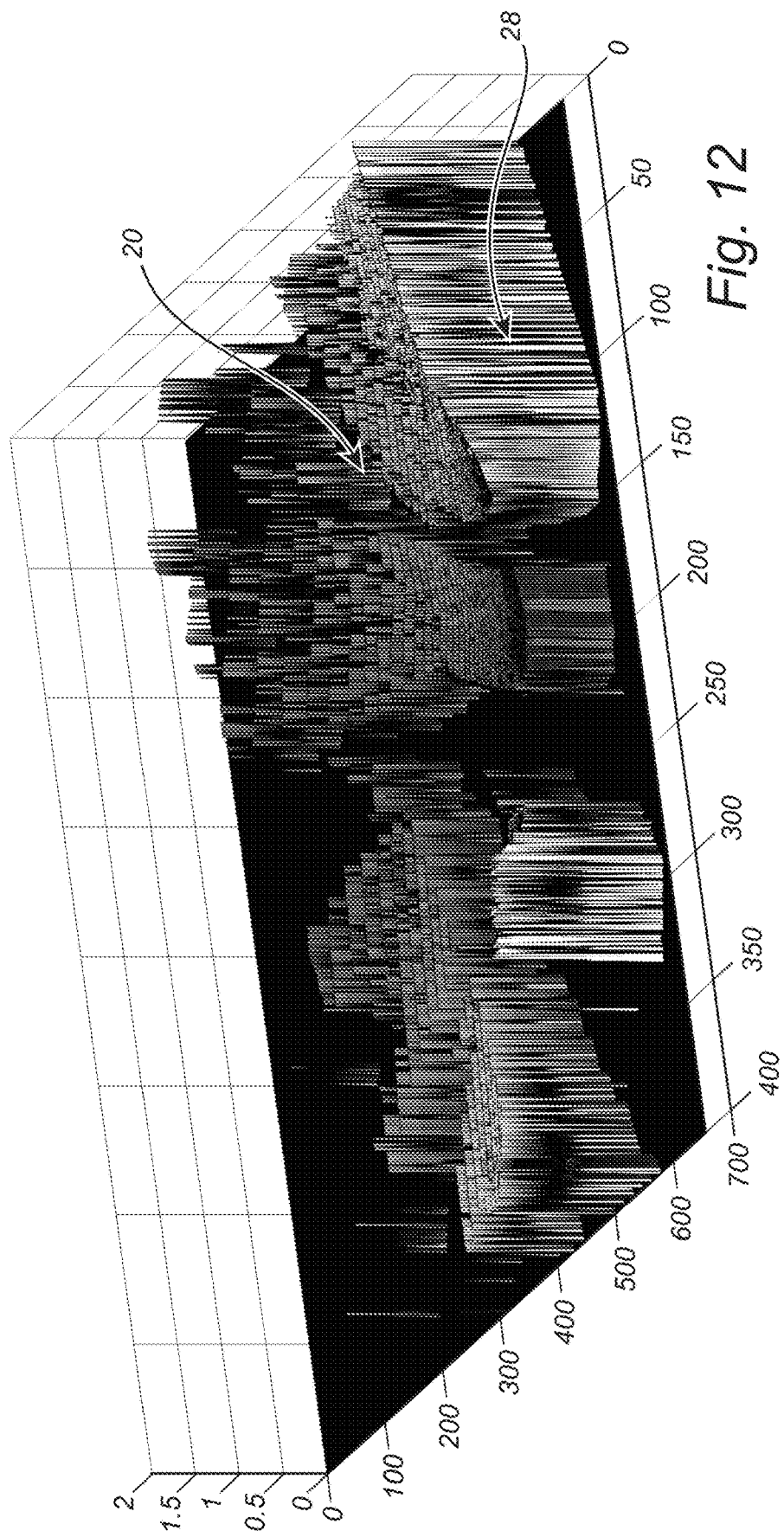
FIG. 12 is a 3-D surface plot of the BEV LIDAR point cloud of FIG. 10 showing a ground plane or drivable surface and scaled r values, r/x, as intensity, in accordance with another aspect of the present disclosure.

FIG. 11 is a 3-D surface plot of the BEV LIDAR point cloud of FIG. 9 showing the ground plane or drivable surface and z values as intensity, while FIG. 12 is a 3-D surface plot of the BEV LIDAR point cloud of FIG. 10 showing the ground plane or drivable surface and scaled r values, r/x, as intensity. Again, the off-road surface 28 is highlighted, which has a different z and r/x values than the surrounding road surface 20. As shown, different surfaces may represent a variation in textural patterns, z values, etc., and clustering based on r metrics only is not feasible to distinguish such surfaces. Thus, patches on the road surface 20 are used to generate pseudo-clusters to estimate slipperiness, p, per patch, proving an indication of safety to proceed, allowing for path planning, etc. The relative position of a given ground patch (x, y), ground height (z), and scaled reflectance (r/x or r/x$^2$, depending on the LIDAR specifications) are thus used for patch classification in terms of slipperiness probability (p). This provides for a robust discrimination between a ground plane or drivable surface, objects, different surfaces, and the road condition.

Figure 13:
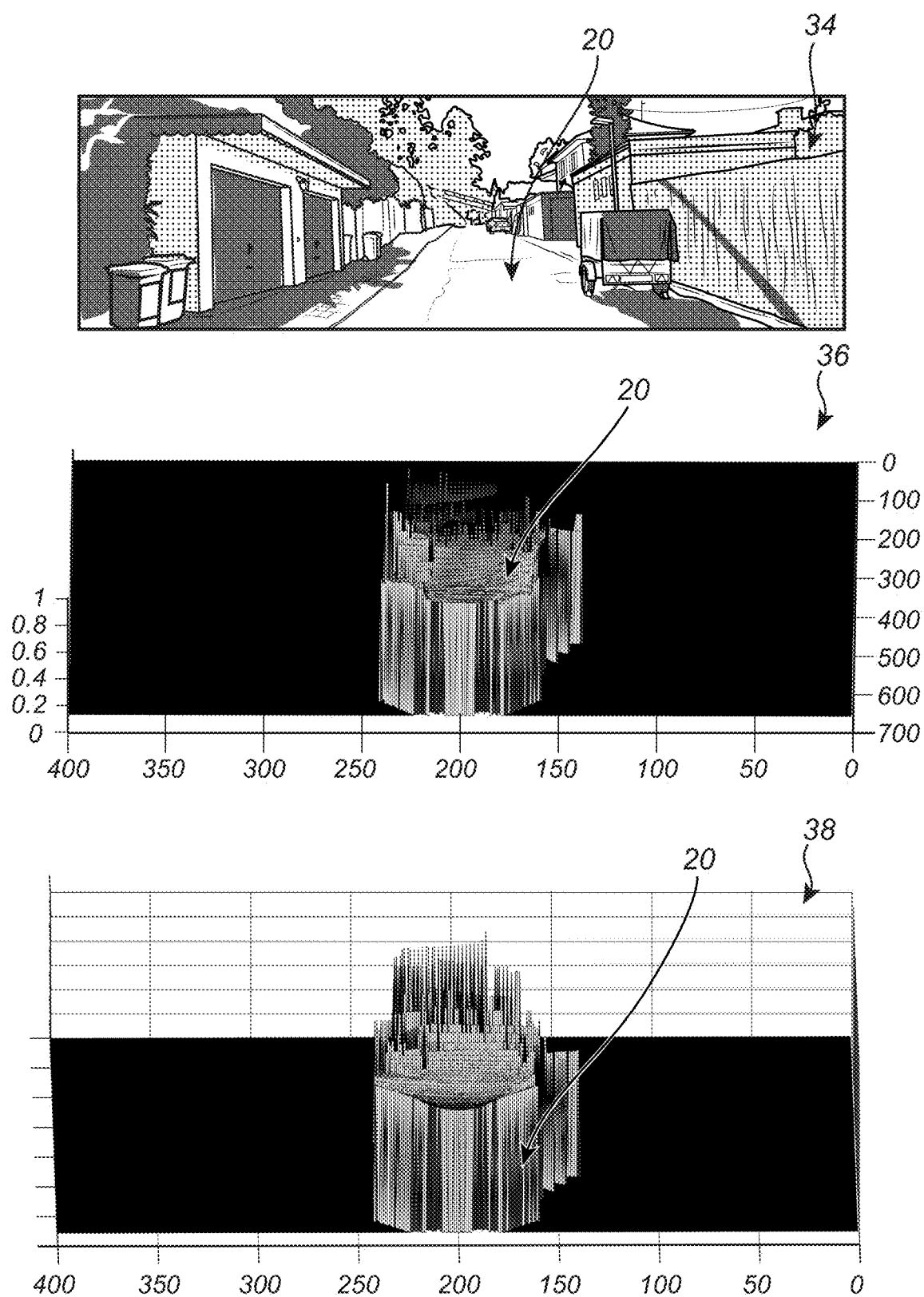
FIG. 13 is a front-facing camera image, a corresponding 3-D surface plot of the BEV LIDAR point cloud showing a ground plane or drivable surface and z values as intensity, and a corresponding 3-D surface plot of the BEV LIDAR point cloud showing a ground plane or drivable surface and scaled r values, r/x, as intensity, in accordance with a further aspect of the present disclosure.

FIG. 13 is a front-facing camera image 34, a corresponding 3-D surface plot 36 of the BEV LIDAR point cloud showing a ground plane or drivable surface 20 and z values as intensity, and a corresponding 3-D surface plot 38 of the BEV LIDAR point cloud showing a ground plane or drivable surface 20 and scaled r values, r/x or r/x$^2$, depending on the LIDAR specifications, as intensity.

Figure 14:
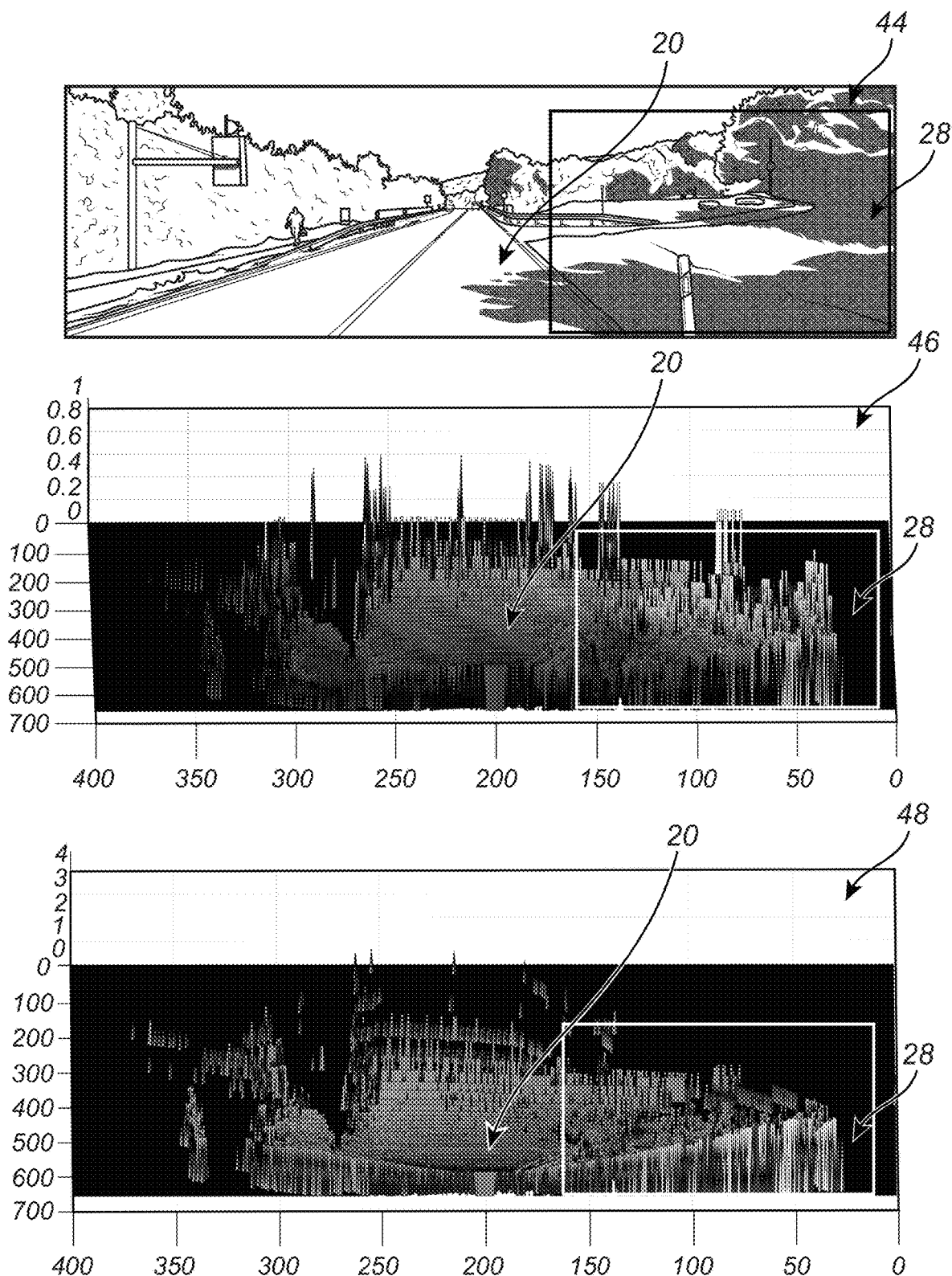
FIG. 14 is a front-facing camera image, a corresponding 3-D surface plot of the BEV LIDAR point cloud showing a ground plane or drivable surface and an adjacent surface and z values as intensity, and a corresponding 3-D surface plot of the BEV LIDAR point cloud showing a ground plane or drivable surface and an adjacent surface and scaled r values, r/x, as intensity, in accordance with a still further aspect of the present disclosure.

FIG. 14 is a front-facing camera image 44, a corresponding 3-D surface plot 46 of the BEV LIDAR point cloud showing a ground plane or drivable surface 20 and an adjacent surface 28 and z values as intensity, and a corresponding 3-D surface plot 48 of the BEV LIDAR point cloud showing a ground plane or drivable surface 20 and an adjacent surface 28 and scaled r values, r/x, as intensity. Again, the off-road surface 28 is highlighted, which has a different z and r/x values than the surrounding road surface 20. As shown, different surfaces may represent a variation in textural patterns, z values, etc., and clustering based on r metrics only is not feasible to distinguish such surfaces. Thus, patches on the road surface 20 are used to generate pseudo-clusters to estimate slipperiness, p, per patch, proving an indication of safety to proceed, allowing for path planning, etc. The relative position of a given ground patch (x, y), ground height (z), and scaled reflectance (r/x or r/x$^2$, depending on the LIDAR specifications) are thus used for patch classification in terms of slipperiness probability (p). This provides for a robust discrimination between a ground plane or drivable surface, objects, different surfaces, and the road condition.

Figure 15:
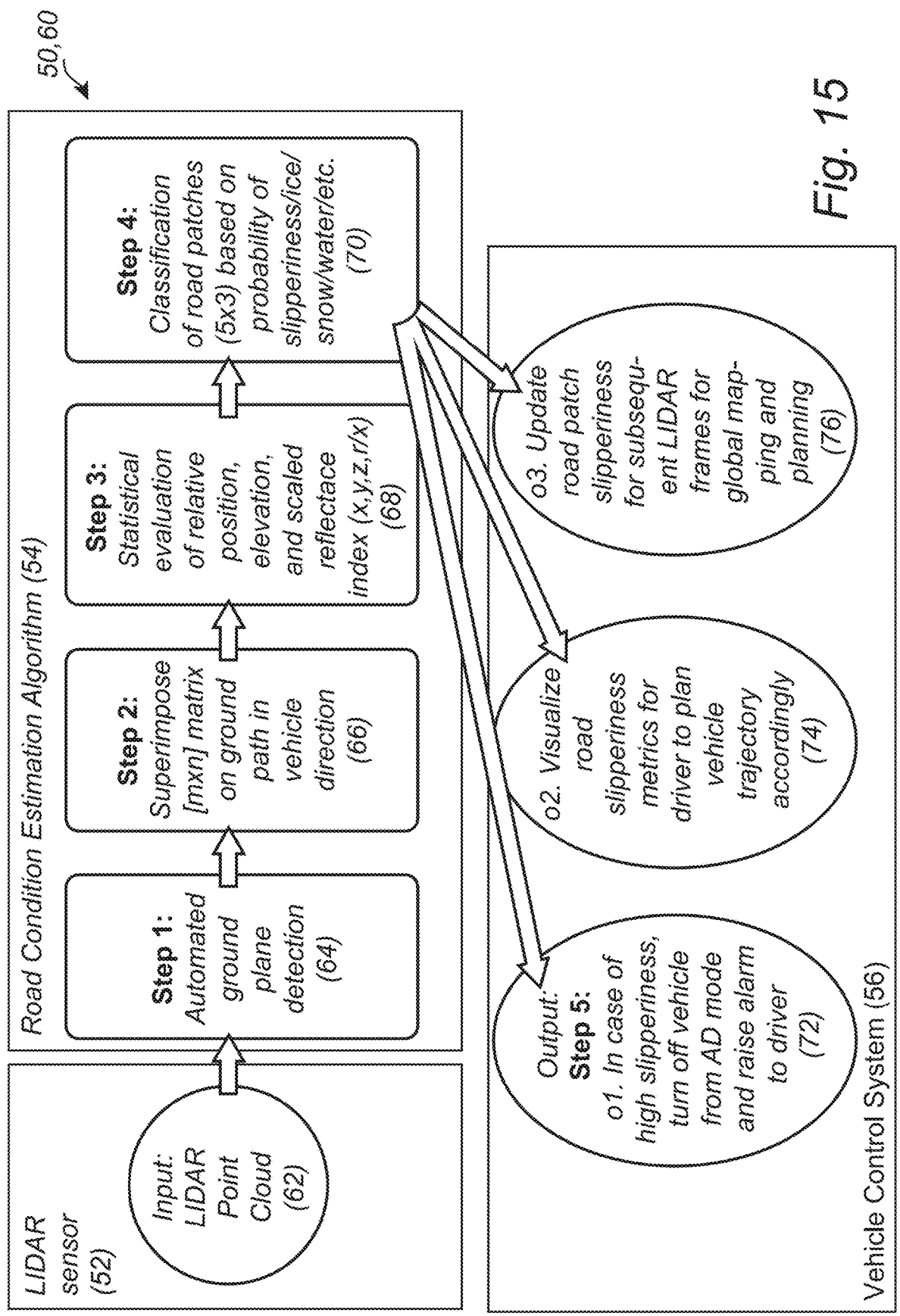
FIG. 15 is schematic diagram and flowchart illustrating one exemplary embodiment of the road condition estimation system and method of the present disclosure.

Referring now specifically to FIG. 15, in one exemplary embodiment, the road condition estimation system 50 of the present disclosure is implemented largely in software executed by a processor resident in a vehicle and/or the cloud. The road condition estimation system 50 includes a LIDAR sensor 52 that is coupled to the vehicle and is operable for obtaining a LIDAR point cloud 62 that is utilized by the road condition estimation system 50. As discussed above, this LIDAR sensor 52 may be disposed at a position on the vehicle that is significantly above the ground plane and road surface, such that the LIDAR sensor 52 is provided with a clear line of sight in front of the vehicle. Advantageously, the LIDAR sensor 52 is minimally impacted by many visibility conditions that would significantly impact a comparable front-facing camera. The LIDAR point cloud data includes four fields per reflected signal point, x, y, z, and r, with x, y, z corresponding to the 3-D location of the given objects/surfaces with respect to the LIDAR sensor 52, z specifically corresponding to the height of a reflected object/surface, and r referring to the associated reflectance index, which is different for different surfaces and surface coverings. The road condition estimation method 60 begins with the road condition estimation algorithm 54 detecting the ground plane or drivable surface 64 in the LIDAR point cloud 62. This can be done using an unsupervised iterative algorithm, or a supervised deep learning/ML algorithm. Subsequently, the M×N matrix is superimposed on the drivable surface ahead of the vehicle 66 in the LIDAR point cloud 62. By way of example only, the M×N matrix may be a 5×3 matrix, with columns disposed along each expected wheel path, a column disposed between the expected wheel paths, and columns disposed outside of the expected wheel paths. Optionally, the M×N matrix extends at least 70-100 m ahead of the vehicle on the ground plane or drivable surface, such that the predictive capability of the road condition estimation system 50 is maximized. Subsequently, each patch of the M×N matrix is statistically evaluated to determine relative position (x, y), feature elevation (z), and scaled reflectance (r/x or r/x$^2$, depending on the LIDAR specifications) 68, as described in greater detail herein above. The statistical features extracted from each patch may include average, standard deviation, distribution of relative position (x, y), height, and scaled reflectance metrics within the patch. Subsequently, each road patch is classified to indicate the extent of roughness or slipperiness 70. Thus, a probabilistic determination is made for each road patch related to ice/snow/slush/water/etc. and road condition for the drivable surface is estimated.

Based on the predicted slipperiness index, p, for each patch and the overall matrix, alarms can be raised, ADAS functionalities can be implemented, and/or an active AD mode can be disabled 72 by the vehicle control system 56. Alternatively or in addition, the predicted slipperiness indices, p, ahead of the vehicle can be formatted and displayed visually to a driver of the vehicle and or fed into the AD function to allow for enhanced vehicle motion and trajectory planning 74. Alternatively or in addition, as the vehicle moves and more LIDAR frames 52 are acquired, the relative positions of road patches can be converted to global coordinate positions and the slipperiness probability updated for each global coordinate position with each new LIDAR frame 52 76. The same patch on the road surface may be visible in multiple LIDAR frames 52, and updating the associated slipperiness probability with respect to global coordinate positions may thus optimize path planning information. All data, of course, may be transmitted to the cloud for use by other vehicles as well.

Figure 16:
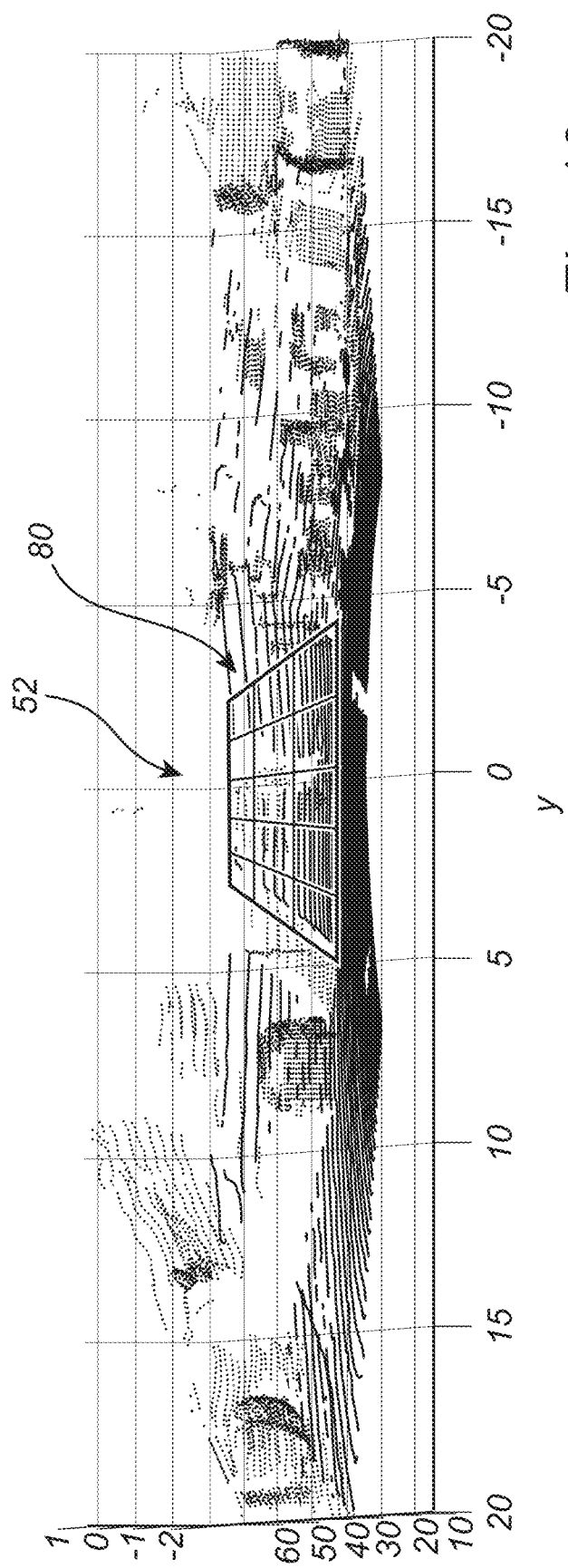
FIG. 16 is a 3-D LIDAR point cloud including a superimposed M×N matrix, in accordance with one aspect of the present disclosure.

FIG. 16 is a 3-D LIDAR point cloud 52 including a superimposed M×N matrix 80. As shown, the matrix 80 covers up to 15 m sideways and up to 70 m ahead on the road surface, with a 5×3 patch arrangement.

Figure 17:
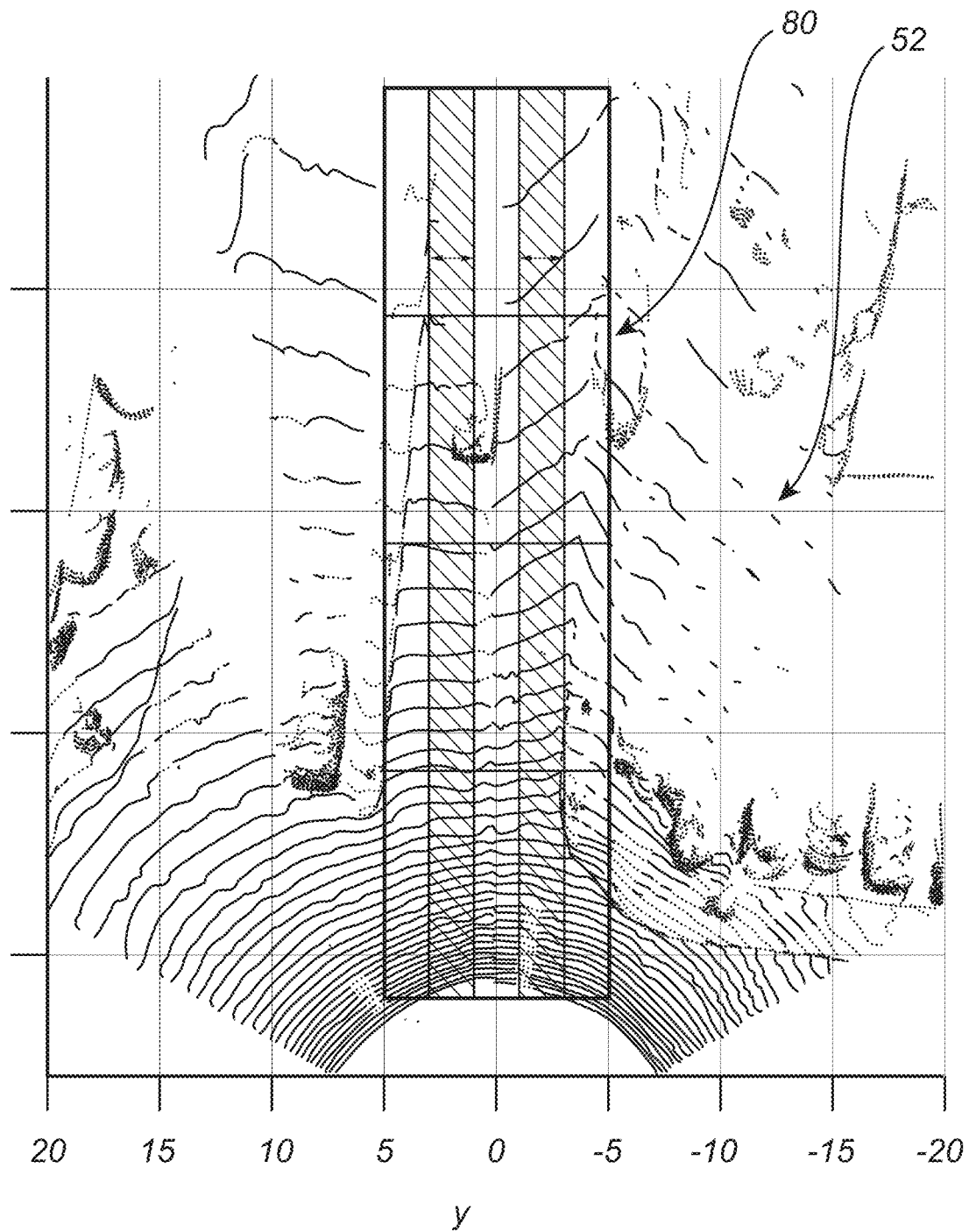
FIG. 17 is a BEV LIDAR point cloud including a superimposed M×N matrix, in accordance with one aspect of the present disclosure.

FIG. 17 is a BEV LIDAR point cloud 52 including a superimposed M×N matrix 80. Again, as shown, the matrix 80 covers up to 15 m sideways and up to 70 m ahead on the road surface, with a 5×3 patch arrangement.

The LIDAR perception sensor utilized here provides the capability to extend vision over camera images to instances with low standing sun, poor lighting, and night-time vision conditions. The framework provided segments the ground plane LIDAR point cloud into several segments and applies statistical features within the ground plane or drivable surface patches to describe a complete road condition in front of the vehicle. Based on the segmented ground plane or drivable surface point clouds, a probability map of slipperiness underneath the vehicle wheels and in the nearby vicinity can be generated, which can be used to warn a driver, turn off AD mode (to ensure safety), and plan vehicle path/trajectory accordingly to minimize vehicle slippage or hydroplaning. As LIDAR frames continue to be acquired, the probability of slipperiness can be updated for global coordinates to allow for optimal vehicle control and path planning applications involving AD functionalities.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus again, the LIDAR perception sensor utilized here provides the capability to extend vision over camera images to instances with low standing sun, poor lighting, and night-time vision conditions. The framework provided segments the ground plane or drivable surface LIDAR point cloud into several segments and applies statistical features within the ground plane or drivable surface patches to describe a complete road condition in front of the vehicle. Based on the segmented ground plane or drivable surface point clouds, a probability map of slipperiness underneath the vehicle wheels and in the nearby vicinity can be generated, which can be used to warn a driver, turn off AD mode (to ensure safety), and plan vehicle path/trajectory accordingly to minimize vehicle slippage or hydroplaning. As LIDAR frames continue to be acquired, the probability of slipperiness can be updated for particular global coordinates to allow for optimal vehicle control and path planning applications involving AD functionalities.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A method for estimating road condition ahead of a vehicle utilizing a LIDAR sensor, the method comprising:
    obtaining a LIDAR point cloud from the LIDAR sensor;
    detecting a ground plane or drivable surface in the LIDAR point cloud;
    superimposing an M×N matrix on at least a portion of the LIDAR point cloud, wherein at least one of M and N has a value greater than 1;
    for each patch of the LIDAR point cloud defined by the M×N matrix, statistically evaluating a relative position (x,y), a feature elevation (z), and a scaled reflectance index (r) comprising $r/x$ or $r/x^2$;
    from the statistically evaluated relative position, feature elevation, and scaled reflectance index, determining a slipperiness probability, on a per patch basis, for each patch of the M×N matrix superimposed on the LIDAR point cloud; and
    based on the determined slipperiness probability, on the per patch basis, for each patch of the M×N matrix superimposed on the LIDAR point cloud, one or more of alerting a driver of the vehicle to an upcoming slippery road condition, enabling/disabling one of a driver assist and an autonomous driving functionality, providing a display of an estimated road condition ahead to the driver of the vehicle for one or more of motion and path planning purposes, updating a past determined slipperiness probability for each patch of a past LIDAR point cloud, and reporting the determined slipperiness probability for each patch of the LIDAR point cloud to a cloud server.

2. The method of claim 1, wherein the LIDAR sensor is coupled to the vehicle and disposed above the ground plane or drivable surface.

3. The method of claim 1, further comprising transforming the LIDAR point cloud from a three-dimensional LIDAR point cloud to a bird's-eye-view LIDAR point cloud.

4. The method of claim 1, wherein detecting the ground plane or drivable surface in the LIDAR point cloud comprises detecting the ground plane or drivable surface in the LIDAR point cloud using one of an unsupervised iterative algorithm and a supervised deep learning/machine learning algorithm.

5. A non-transitory computer readable medium for estimating road condition ahead of a vehicle stored in a memory and executed by a processor to perform the steps comprising:
   obtaining a LIDAR point cloud from a LIDAR sensor;
   detecting a ground plane or drivable surface in the LIDAR point cloud;
   superimposing an M×N matrix on at least a portion of the LIDAR point cloud, wherein at least one of M and N has a value greater than 1;
   for each patch of the LIDAR point cloud defined by the M×N matrix, statistically evaluating a relative position (x,y), a feature elevation (z), and a scaled reflectance index (r) comprising $r/x$ or $r/x^2$;
   from the statistically evaluated relative position, feature elevation, and scaled reflectance index, determining a slipperiness probability, on a per patch basis, for each patch of the M×N matrix superimposed on the LIDAR point cloud; and
   based on the determined slipperiness probability, on the per patch basis, for each patch of the M×N matrix superimposed on the LIDAR point cloud, one or more of alerting a driver of the vehicle to an upcoming slippery road condition, enabling/disabling one of a driver assist and an autonomous driving functionality, providing a display of an estimated road condition ahead to the driver of the vehicle for one or more of motion and path planning purposes, updating a past determined slipperiness probability for each patch of a past LIDAR point cloud, and reporting the determined slipperiness probability for each patch of the LIDAR point cloud to a cloud server.

6. The computer readable medium of claim 5, wherein the LIDAR sensor is coupled to the vehicle and disposed above the ground plane or drivable surface.

7. The computer readable medium of claim 5, wherein the steps further comprise transforming the LIDAR point cloud from a three-dimensional LIDAR point cloud to a bird's-eye-view LIDAR point cloud.

8. The computer readable medium of claim 5, wherein detecting the ground plane or drivable surface in the LIDAR point cloud comprises detecting the ground plane or drivable surface in the LIDAR point cloud using one of an unsupervised iterative algorithm and a supervised deep learning/machine learning algorithm.

9. A system for estimating road condition ahead of a vehicle, the system comprising:
   a LIDAR sensor operable for generating a LIDAR point cloud;
   a processor executing a road condition estimation algorithm stored in a memory, the road condition estimation algorithm performing the steps comprising:
      detecting a ground plane or drivable surface in the LIDAR point cloud;
      superimposing an M×N matrix on at least a portion of the LIDAR point cloud, wherein at least one of M and N has a value greater than 1;
      for each patch of the LIDAR point cloud defined by the M×N matrix, statistically evaluating a relative position (x,y), a feature elevation (z), and a scaled reflectance index (r) comprising $r/x$ or $r/x^2$; and
      from the statistically evaluated relative position, feature elevation, and scaled reflectance index, determining a slipperiness probability, on a per patch basis, for each patch of the M×N matrix superimposed on the LIDAR point cloud; and
   a vehicle control system operable for, based on the determined slipperiness probability, on the per patch basis, for each patch of the M×N matrix superimposed on the LIDAR point cloud, one or more of alerting a driver of the vehicle to an upcoming slippery road condition, enabling/disabling one of a driver assist and an autonomous driving functionality, providing a display of an estimated road condition ahead to the driver of the vehicle for one or more of motion and path planning purposes, updating a past determined slipperiness probability for each patch of a past LIDAR point cloud, and reporting the determined slipperiness probability for each patch of the LIDAR point cloud to a cloud server.

10. The system of claim 9, wherein the LIDAR sensor is coupled to the vehicle and disposed above the ground plane or drivable surface.

11. The system of claim 9, wherein the steps performed by the road condition estimation algorithm further comprise transforming the LIDAR point cloud from a three-dimensional LIDAR point cloud to a bird's-eye-view LIDAR point cloud.

12. The system of claim 9, wherein detecting the ground plane or drivable surface in the LIDAR point cloud comprises detecting the ground plane or drivable surface in the LIDAR point cloud using one of an unsupervised iterative algorithm and a supervised deep learning/machine learning algorithm.

13. The method of claim 1, wherein the feature elevation and the scaled reflectance index are determined for each relative position within each patch.

14. The computer readable medium of claim 5, wherein the feature elevation and the scaled reflectance index are determined for each relative position within each patch.

15. The system of claim 9, wherein the feature elevation and the scaled reflectance index are determined for each relative position within each patch.

16. The method of claim 1, wherein the slipperiness probability for each patch of the M×N matrix superimposed on the LIDAR point cloud provides a slipperiness probability, on the per patch basis, for each patch as a whole.

17. The computer readable medium of claim 5, wherein the slipperiness probability for each patch of the M×N matrix superimposed on the LIDAR point cloud provides a slipperiness probability, on the per patch basis, for each patch as a whole.

18. The method of claim 1, further comprising updating the determined slipperiness probability for each patch based on a subsequent LIDAR frame for a same patch.

19. The computer readable medium of claim 5, wherein the steps further comprise updating the determined slipperiness probability for each patch based on a subsequent LIDAR frame for a same patch.

20. The system of claim 9, wherein the steps performed by the road condition estimation algorithm further comprise updating the determined slipperiness probability for each patch based on a subsequent LIDAR frame for a same patch.

* * * * *